Jan. 9, 1945.　　　　　J. S. BELLIG　　　　　2,366,828
FEED BACK SHIELD FOR THRESHING MACHINES
Filed Oct. 19, 1942　　　2 Sheets-Sheet 1

Inventor
Joseph Sherman Bellig

By Clarence A. O'Brien
and Harvey B. Jacobson
Attorneys

Jan. 9, 1945.   J. S. BELLIG   2,366,828
FEED BACK SHIELD FOR THRESHING MACHINES
Filed Oct. 19, 1942   2 Sheets-Sheet 2

Inventor
Joseph Sherman Bellig

By Clarence A. O'Brien
and Harvey B. Jacobson
Attorneys

Patented Jan. 9, 1945

2,366,828

UNITED STATES PATENT OFFICE 2,366,828

FEED-BACK SHIELD FOR THRESHING MACHINES

Joseph Sherman Bellig, North Mankato, Minn.

Application October 19, 1942, Serial No. 462,545

2 Claims. (Cl. 130—27)

The present invention relates to new and useful improvements in agricultural machines, such as combines, harvesters and threshers, and has for its primary object to provide, in a manner as hereinafter set forth, novel means for preventing the threshed straw from being drawn back around the cylinder which it has just left, thereby overloading said cylinder and clogging the machine.

Another very important object of the invention is to provide a feed back shield of the aforementioned character which is adapted to be expeditiously mounted for operation in the machine without the necessity of making material structural alterations therein.

Other objects of the invention are to provide a feed back shield of the character described which will be comparatively simple in construction, strong, durable, highly efficient and reliable in use, compact, and which may be manufactured and installed at low cost.

All of the foregoing and still further objects and advantages of the invention will become apparent from a study of the following specification, taken in connection with the accompanying drawings wherein like characters of reference designate corresponding parts throughout the several views, and wherein.

Figure 1:
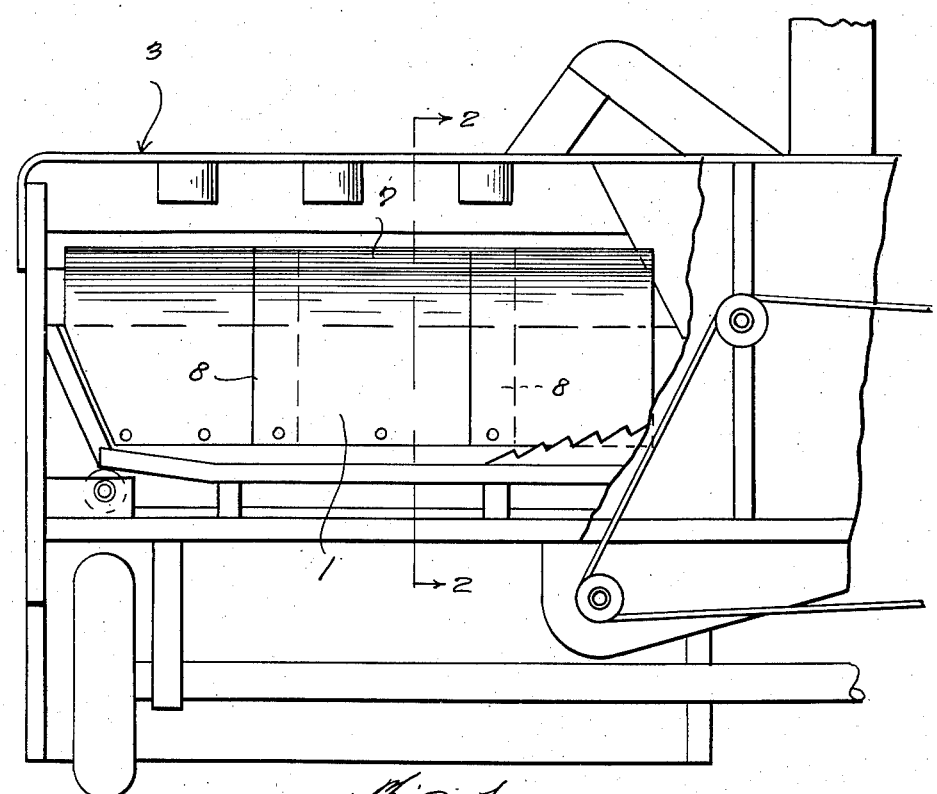
Figure 1 is a view in rear elevation, showing a feed back shield constructed in accordance with the present invention in position in a combine.
Figure 2:
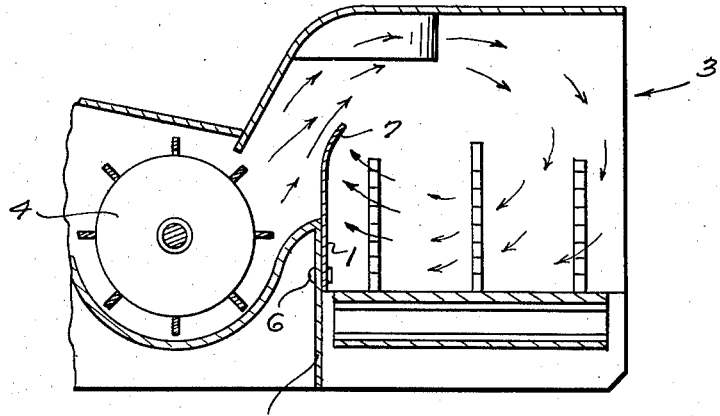
Figure 2 is a vertical sectional view, taken substantially on the line 2—2 of Figure 1.
Figure 3:
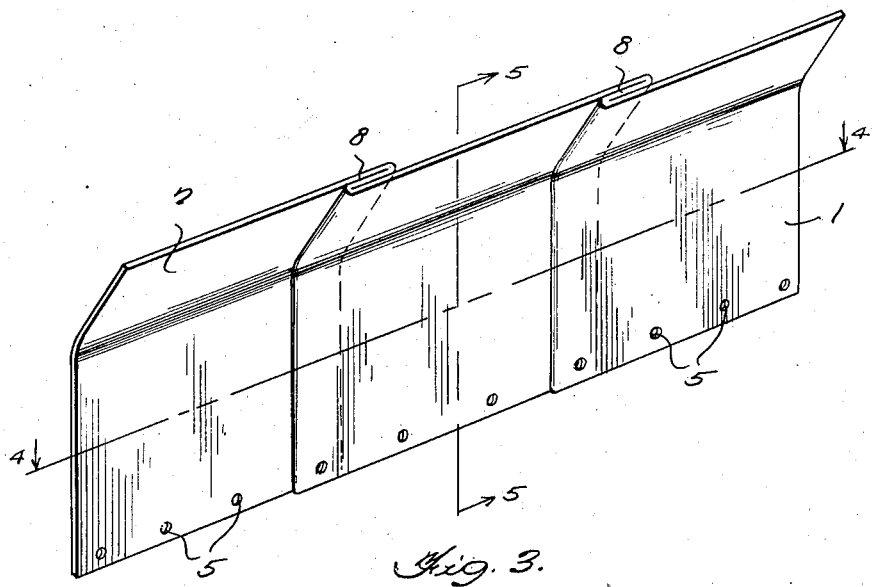
Figure 3 is a perspective view of the shield.
Figure 4:
Figure 4 is a view in horizontal section through the shield, taken substantially on the line 4—4 of Figure 3.
Figure 5:
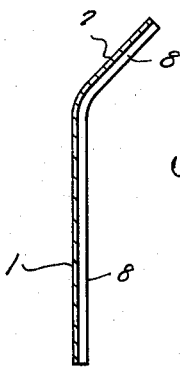
Figure 5 is a cross-sectional view through the shield, taken substantially on the line 5—5 of Figure 3.

Referring now to the drawings in detail, it will be seen that the embodiment of the invention which has been illustrated comprises an elongated sheet 1 of suitable metal. The sheet 1 is adapted to be firmly secured in a vertical position on the usual concave housing 2 of a conventional combine 3, or other machine, directly in back of the cylinder 4. Toward this end, the lower marginal portion of the sheet 1 has formed therein a series of spaced openings 5 which accommodate securing bolts 6. It will be observed that the sheet 1 extends upwardly above the concave housing 2, as illustrated to advantage in Figure 2 of the drawings. If desired, the sheet 1 may also be mounted on the straw rack of the machine.

The upper portion of the sheet 1 is curved or bent rearwardly, as at 7. At longitudinally spaced points the metallic sheet 1 is folded vertically on itself in a manner to provide reinforcing or stiffening pleats 8.

It is thought that the operation of the invention will be readily apparent from a consideration of the foregoing. Briefly, the threshed straw, when it leaves the cylinder 4, travels substantially in the path indicated by the arrows in Figure 2 of the drawings. The straw which flows back toward the cylinder 4 is directed upwardly and rearwardly again by the sheet 1. It will thus be seen that the sheet 1 constitutes a shield or baffle which positively prevents the straw from being drawn back around the cylinder 4. It will be observed that the construction and arrangement is such that the device may be economically formed from a single sheet of relatively light metal.

It is believed that the many advantages of a feed back shield constructed in accordance with the present invention will be readily understood, and although a preferred embodiment of the device is as illustrated and described, it is to be understood that changes in the details of construction may be resorted to which will fall within the scope of the invention as claimed.

What is claimed is:

1. In combination with a concave of a threshing or like machine, wherein said concave has a vertical wall at the back thereof, a feed back shield comprising a horizontally elongated sheet of metal having a vertical lower portion and a rearwardly directed upper portion, said sheet having a series of openings along the lower margin thereof, and means passing through said openings and the vertical wall of the concave to rigidly fasten the lower portion of the shield to the upper portion of said vertical wall, said sheet being provided at longitudinally spaced points with vertical folds providing stiffening pleats that extend from the top to the bottom of the shield.

2. A feed back shield attachment for a threshing or like machine wherein the machine has a concave provided at the back thereof with a vertical wall, said attachment comprising a horizontally elongated sheet of metal having a vertical lower portion and a rearwardly directed upper portion, said sheet having a series of openings along the lower margin thereof to receive means for rigidly securing the shield to the vertical wall of the concave, said sheet being provided at longitudinally spaced points with vertical folds providing stiffening pleats that extend from the top to the bottom of the shield.

JOSEPH SHERMAN BELLIG.